March 7, 1972  J. W. GREIG  3,647,588

METHOD FOR MAKING FOAM PANEL

Filed Nov. 28, 1969  5 Sheets-Sheet 1

INVENTOR
JAMES W. GREIG
BY
Burton & Parker
ATTORNEYS

March 7, 1972  J. W. GREIG  3,647,588
METHOD FOR MAKING FOAM PANEL
Filed Nov. 28, 1969  5 Sheets-Sheet 2

INVENTOR
JAMES W. GREIG
BY
Burton & Parker
ATTORNEYS

March 7, 1972  J. W. GREIG  3,647,588
METHOD FOR MAKING FOAM PANEL
Filed Nov. 28, 1969  5 Sheets-Sheet 3

INVENTOR.
JAMES W. GREIG
BY
Burton & Parker
ATTORNEYS

INVENTOR.
JAMES W. GREIG
BY
*Burton & Parker*
ATTORNEYS

United States Patent Office 3,647,588
Patented Mar. 7, 1972

3,647,588
METHOD FOR MAKING FOAM PANEL
James W. Greig, Grosse Pointe Park, Mich., assignor to Woodall Industries Inc.
Continuation-in-part of abandoned application Ser. No. 514,605, Dec. 17, 1965. This application Nov. 28, 1969, Ser. No. 880,745
Int. Cl. B32b 5/20
U.S. Cl. 156—79
8 Claims

ABSTRACT OF THE DISCLOSURE

A process for making cellular foam sheets and panels embodying a preselected contour by foaming in situ a layer of a liquid reaction mixture deposited in a selected pattern of controlled thicknesses corresponding to the variations in thickness of the resultant contoured panel, providing therewith a substantially uniform cell structure devoid of any blow channels. The invention further encompasses the apparatus for practicing the foregoing process, as well as the improved panels produced thereby.

CROSS REFERENCE TO RELATED APPLICATIONS

This application is a continuation-in-part of prior copending application Ser. No. 514,605, filed Dec. 17, 1965, and now abandoned, for "Plastic Laminate and Method and Apparatus for Making Same."

SUMMARY OF THE INVENTION

An object of the invention is the provision of a laminated panel or sheet having a plastic foam lamination to one surface of which is secured a flexible finish lamination deformed so that its outer surface exhibits a decorative design which is imparted through the finish lamination into the foam lamination with the foam lamination holding the finish lamination permanently to said design.

The foam lamination may be a flexible, compressible cushion-like foam, and the resulting sheet comprising the decorative finish lamina and the foam lamina will consequently be flexible and partake of the character of the foam lamina. Alternatively, the foam lamina may be relatively rigid and in this instance, the sheet will be of a more self-supporting, rigid character. The "finish" layer or lamina herein disclosed is a flexible thermoplastic layer, but it will be understood that flexible layers finish layers of other materials may be used, such as cloth, paper, metal foil, etc., depending upon the intended application and decorative effect desired. Because the finish lamination is flexible, the surface configuration thereof is maintained permanently by being imparted to the foam lamination which underlies the finish lamination, and said two laminations are secured together so that the flexible foam lamination holds the finish lamination permanently to maintain and exhibit said configured design. The foam lamination is preferably a thermosetting lamination, particularly where sheet or panel is intended for use in automotive trim applications.

The invention also contemplates a laminated panel structure which is made up of a foundation sheet of rigid foam, to which is secured a decorative sheet comprising a flexible foam and a decorative surface layer. For example, there may be a foundation lamination formed of a relatively rigid thermosetting plastic foam material, a flexible resilient thermosetting foam cushion lamination secured to the foundation lamination, and an outer finish thermoplastic lamination to which has been imparted a decorative design held therein by such design being imparted at the same time also to the flexible resilient thermosetting foam lamination.

Another object of the invention is the provision of a laminated structure having a foam core of relatively rigid thermosetting material blown and cured in situ from a liquid plastic between and adhering to a pair of cover sheets, at least one of which exhibits a varying contour, and in which the core is substantially free of blow channels.

In manufacturing the laminated sheet or panels above described, a number of method aspects are involved in this disclosure. For example, in manufacturing a panel having a rigid foundation lamination with a flexible thermosetting foam layer thereon covered by a flexible finish lamina, I have found that the panel may be conveniently and economically formed by having the thermosetting flexible resilient foam lamination secured to the foundation lamination by being cured in situ thereupon and the outer finish lamination secured to the flexible resilient foam lamination by having the completion of the cure of the flexible foam lamination accomplished in situ against the finish lamination. This may be accomplished by heating and causing the flexible foam to blow from a liquid plastic mixture layer to a fully blown but incompletely cured foam layer between a pair of cover sheets, one of which is the finish lamina, and then stripping the non-finish lamina cover sheet therefrom and juxtaposing the tacky surface from which such cover sheet was stripped upon the foundation lamination and securing the same thereto by completing the cure in situ thereagainst.

Another feature of the invention involved in the process is that of forming the foam foundation lamination so that different foamed areas exhibit different thicknesses for purposes desirable in the use thereof, by depositing a layer of a mixture of the ingredients required to form the foam lamination between a pair of cover sheets and arranging said mixture therebetween to exhibit throughout different determined areas different thicknesses of said liquid layer mixture, and then causing the same to blow to its foamed state, providing a blown and cured lamination having said predetermined but correspondingly different foam thicknesses. The blowing and curing of the foam between the cover sheets may occur while the sandwich is between a pair of heated dies whose forming faces are spaced at varying distances apart and the varying thickness of the liquid foamable layer corresponds in location with and as a function of such varying distances between the die faces. This aspect of the method is particularly suited for forming a rigid thermosetting foam structure free of undesirable blow channels.

In carrying out the process immediately above mentioned, the mixture of ingredients which forms the rigid thermosetting foam lamination is deposited as a liquid mixture between a pair of opposed cover sheets, one of which cover sheets directly superposes the surface of a caul or a caul-like support and which caul surface exhibits adjacent areas of different elevations; and pressure is thereafter applied to said two cover sheets and the layer of plastic ingredients therebetween urging them against the caul and forcing the cover sheet directly superposing the caul into close contact with the surface of the caul at the different elevations, whereby the liquid layer mixture of foam forming ingredients exhibits determined areas of different thickness upon the caul, all depending upon the different areas of elevation of the caul. When the rigid foam lamination is completely cured, it will exhibit areas of different thicknesses corresponding relatively to the different thicknesses of the mixture established upon the caul.

Another aspect of the method disclosed relates to what I characterized as the progressive formation of a succession of foamed plastic sheets, the method being carried out by depositing batches of foamable liquid resin in spaced relationship between a pair of cover sheets which are passed between metering rolls and in which all the resin of each batch passes between the rolls, to exhaust all resin at the nip of the rolls, before the next resin batch passes between the rolls, and permitting the resin to blow between the sheets after passing between the rolls.

The invention disclosed herein also relates to certain apparatus which is employed in carrying out the process in fabricating the product and its components hereinabove described.

Other objects, advantages and meritorious features will more particularly appear from the following description, claims and accompanying drawings.

BRIEF DESCRIPTION OF THE DRAWINGS

FIGS. 1 through 5A relate to the method of forming a plastic sheet or panel having a thermosetting rigid foam core layer.

FIGS. 6 through 8 relate to the process of forming a flexible laminated sheet, and wherein:

FIG. 10 is a sectional view through a fragment of an improved three lamination structure made according to the method taught herein, such as an automotive headliner panel, wherein the upper rigid plastic foam foundation lamination exhibits in exaggerated enlargement wrinkles in the lower paper cover sheet thereof adjacent to the flexible foam lamination, and also exhibits deformation of the rigid foam foundation lamination to accommodate for portions of the body structure such as a roof brace or ceiling light support or the like.

DESCRIPTION OF THE PREFERRED EMBODIMENTS

While this invention is illustrated as to the product in a headliner embodiment as provided for a closed motor vehicle body, it is obvious that it might be embodied in a laminated panel or sheet other than a headliner. Automobile door trim panels are examples of other products particularly susceptible of being fabricated according to this process and could well typify the product. Other structures might be so fabricated. The invention might be embodied in structures utilizing the multi-ply plastic panel or its separate components. It will also be obvious that invention may likewise reside in the process employed in forming the separate components as well as the process employed in forming the multi-ply panel. It is also obvious that the apparatus is likewise involved.

Figure 10:
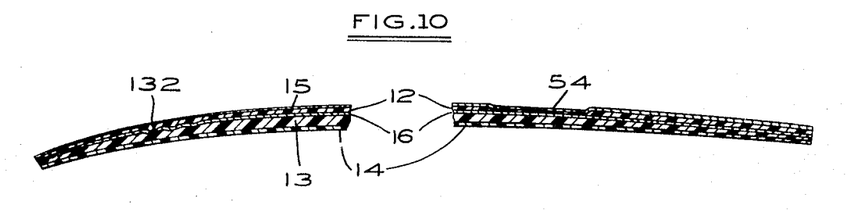
Figure 11:
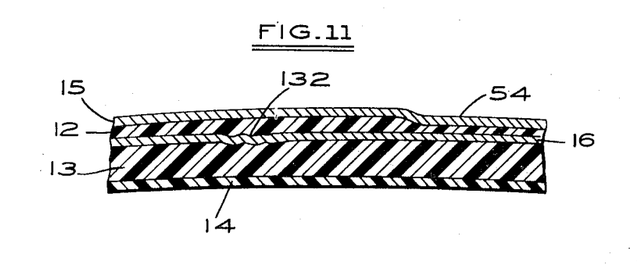
FIG. 11 is an enlarged sectional view of the multi-ply headliner panel of FIG. 10, showing particularly the features of the rigid foam lamination referred to hereinabove in the description of FIG. 10.

The most complete and preferred form of headliner panel shown as an embodiment of the inventive idea and in connection with the fabrication of which the process and apparatus is illustrated, is herein illustrated in the fragments shown in FIGS. 10 and 11. As illustrated in these figures, in a headliner for a motor vehicle closed body, such headliner is formed as a unitary laminated construction consisting of a thermosetting plastic foam lamination of a relatively rigid self-supporting foundation character, plus a soft flexible thermosetting plastic foam lamination overlying the foundation lamination and secured thereto, and provided on its outer surface with a decorative finish lamination secured thereover.

The foundation lamination would have the area, shape and contour required to fit against the roof of the particular car body in which the headliner was to be used. Such foundation lamination is indicated in FIGS. 10 and 11 by the numeral 12. This foundation sheet might be a rigid thermosetting plastic foam sheet, as herein shown. A flexible resilient thermosetting plastic foam cushion lamination indicated by the numeral 13, which might be a urethane thermosetting plastic sponge, overlies the foundation lamination and is adhesively secured thereto. An outer finish decorative vinyl plastic lamination indicated by the numeral 14 overlies and is secured to the cushion lamination 13 all as hereinafter described.

The flexible thermosetting foam lamination might be omitted from the assembly and the rigid thermosetting plastic foam lamination might be provided in the desired thickness and also provided on its underside, if desired, with the decorative finish lamination shown and used in the headliner hereinabove described. On the other hand, the flexible resilient thermosetting foam lamination with its decorative vinyl plastic lamination secured thereto might be formed in the desired thickness and adhesively suitably secured against the underside of the roof of the car body. In other words, these separate components, the rigid thermosetting foam lamination and/or the flexible thermosetting foam lamination, might be used independently of each other as a headliner.

Thermosetting foam composition

The terms "thermosetting foam" and "urethane sponge," as employed in the description and subjoined claims, is intended to encompass cellular foams of the thermosetting type which can be prepared as a liquid reaction mixture and foamed in situ, of which polyurethane type foams constitute the preferred material. The thermosetting foams are further characterized as being selected from the rigid, semi-rigid and flexible types to provide the requisite resiliency and/or structural strength to best adapt the resultant panel to its intended end use.

Polyurethane foams of the types well known in the art constitute the preferred material due to the flexibility and versatility provided in attaining the desired physical properties of the resultant foam sheet and panels. Such polyurethane foam reaction mixtures contain, as their essential constituents, a polymeric material containing active hydrogens, a polyisocyanate constituent, a blowing agent and a catalyst. For the purpose of the present invention, any one of the variety of the foregoing constituents well known in the art and commercially available can be employed for forming the liquid foam reaction mixture. Typical of polymeric materials containing active hydrogens are polyester resins, polyester amides, hydroxyl-containing polyether resins and mixtures of two or more of the foregoing. Such polyester and polyesteramide materials are generally formed from bifunctional materials including dibasic carboxylic acids, amino carboxylic acids, glycols, amine alcohols and diamines. In the preparation of such polymeric materials, small proportions of trifunctional constituents can also be employed.

In addition to the resin constituent, the liquid foam reaction mixture includes a polyisocyanate constituent which generally is employed in an amount of from about 30 mole percent to about 130 mole percent of isocyanate groups relative to the active hydrogen groups present in the resin constituent. Of the various well known polyisocyanates that can be satisfactorily employed, 2,4-tolylene diisocyanate; 2,6-tolylene diisocyanate, as well as mixtures thereof, are most common. Among other usable polyisocyanate constituents are methylene bis(4-phenylisocyanate); 3,3'-bitolylene - 4,4' - diisocyanate; 3,3'-dimethoxy-4,4' - biphenylene diisocyanate; 4,4',4''-triphenylmethane triisocyanate; 1,5-naphthyl diisocyanate; polymethylene polyphenylisocyanate, etc., as well as mixtures thereof.

Any one of a variety of well known catalysts can be employed for catalyzing the isocyanate reaction, of which tertiary amines including triethylamine, N-methyl morpholine, triethanolamine, etc., are the most common. In addition to the amine compounds, antimony compounds and tin compounds can also be satisfactorily employed for catalyzing the reaction and such other compounds typically include antimony caprylate, antimony naphthenate, antimonous chloride, dibutyltin dilaurate, tri-n-octyltin oxide, hexabutylditin, tributyltin dilaurate, tributyltin phosphate or stannic chloride.

As previously indicated, the attainment of a resultant cellular structure possessing the desired degree of rigidity or flexibility is attained by well known adjustments of the chemical composition of the liquid foam reaction mixture to produce a resultant cured foam of the desired physical properties. When substantially rigid polyurethane foams are desired, a highly branched hydroxyl-rich polyester or polyether resin is used generally having a hydroxyl number of between about 200 and 950. On the other hand, when flexible polyurethane foams are desired, a more linear hydroxyl-poor polyester or polyether resin is used wherein the hydroxyl number is controlled usually between about 30 and 100. Semi-rigid type polyurethane foams are conventionally obtained when similar polyester or polyether resins are used having hydroxyl numbers between about 100 and about 200. By thus controlling the hydroxyl number of the resin constituent, the degree of cross-branching during the foaming reaction is controlled and hence, the rigidity of the resultant foam structure is established.

The most common foaming agent used is water, which reacts with a portion of the polyisocyanate constituent present to generate cabon dioxide gas, as well as activating points to effect a cross-linking of the polymeric material. Alternatively, various foaming agents well known in the art, which are capable of liberating gaseous products when heated or when reacted with an isocyanate, can also be satisfactorily used. It is usually preferred to effect the foaming reaction by introducing a low-boiling liquid in the liquid foam reaction mixture, whereby the heat of reaction is sufficient to effect an expansion of the liquid to a cellular structure in which form it is cured. Of the various low-boiling liquids that can be satisfactorily employed for this purpose, the fluorochlorocarbons having boiling points in the range of from about 20° C. to 50° C. are preferred. Typical of these are trichlorofluoromethane, trichlorotrifluoroethane, dichloromonofluoromethane, monochloroethane, monochloromonofluorethane, difluoromonochloroethane and diflurodichloroethane.

In addition to the foregoing constituents, the liquid foam reaction mixture may additionally include, as optional ingredients, suitable fillers, reinforcing agents, coloring agents including dyes and pigments, anti-oxidants, accelerators, fire-resistant additives, etc. It will be understood that the formulation of a liquid foam reaction mixture suitable for use in accordance with the practice of the present invention can be achieved in accordance with the technology well known in the art to provide a resultant cellular foam structure possessing the desired physical properties for providing optimum performance in actual use.

Rigid plastic foam lamination and its formation

Describing first the rigid plastic foam foundation lamition and its formation, such is formed from a mixture of determined amounts of ingredients as hereinafter particularly specified in one specific formulation. This mixture is laid down, blown and shaped between a pair of cover or liner sheets 15 and 16, as shown in FIGS. 1–4. These cover sheets may be paper or other suitable material. The lower cover sheet 15 is delivered to and directly overlies a caul 25 which is supported upon a table 36 to be advanced over the table and between a pair of metering rolls as hereinafter described. It is understood that such foundation lamination might be other than rigid plastic foam. It might be a formed fiber composition board or other suitable foundation material.

Figure 1:
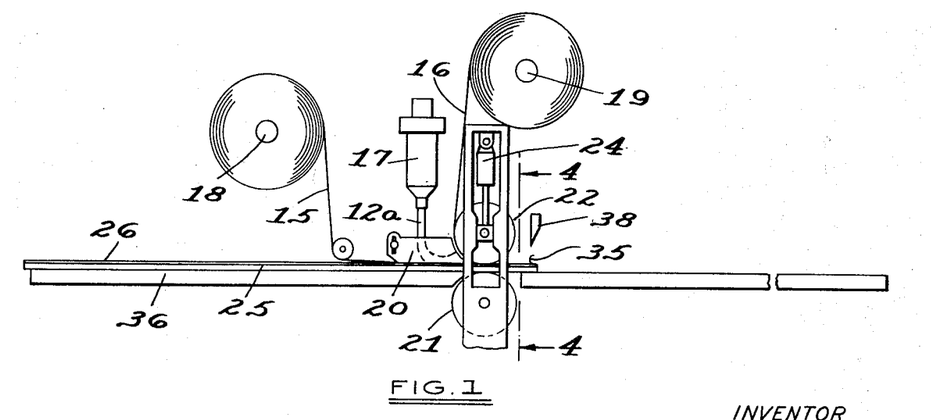
FIG. 1 is a diagrammatic side view of apparatus for depositing and spreading a liquid foamable layer between a pair of cover sheets in carrying out the initial part of the process of forming a rigid plastic foam sheet or panel.

However, as herein illustrated, a suitable mixer 17, FIG. 1, is diagrammatically shown. It is a mixer of the type that the ingredients flow into and directly through the mixer as a continuous flow process for the quantity delivered thereto. They are mixed together as they flow therethrough. When they are discharged therefrom, they have been properly mixed. The required ingredients in the required amounts are delivered to the mixer from means, not shown, in such a quantity as to form a layer of liquid plastic of the desired thickness and area between the cover sheets 15 and 16.

Successive deliveries of components to the mixer to form successive batches are intermittent in that following each passage of one batch through the mixer, and such delivery is sufficient to form the desired plastic layer sheet, the mixer is flushed out before the next batch is fed thereinto. The elements of this apparatus are all shown diagrammatically in FIG. 1. Such mixer apparatus is well known. The discharge of this liquid plastic mixture, identified as 12a, from the mixer, is automatically controlled and carefully regulated because it is necessary that each delivery consist of just the required amounts of components to form the sheet being prepared.

The mixture 12a is delivered from the mixer 17 to and upon the sheet 15 which is unwound from the roll 18 and below the sheet 16 which is unwound from the roll 19. These sheets 15 and 16 may be kraft paper sheets, or other suitable material. This mixture 12a is in a liquid viscous plastic state and passes with its cover sheets 15 and 16 between a pair of dam elements 20 disposed spaced apart adjacent to the linear edges of the sheet 15 and at the nip of a pair of metering rolls 21 and 22. Such dam elements are shiftably supported to rise and fall as shown.

The lower roll 21 is rotatably supported in a stationary position. The upper roll 22 is shiftably supported to rise and fall as necessary. It is held downwardly toward the lower roll by suitable means such as pressure piston and cylinder mechanism 24 of a conventional character as shown in FIG. 1. The spacing of the upper roll above the lower roll during operation is determined by spacers or boundary walls carried by the cauls, as hereinafter described. The pressure of this mechanism can be closely regulated to bring the desired pressure to bear upon the mixture layer delivered to the sheet 15 overlying the caul to spread the mixture smoothly between the sheets 15 and 16, as determined by the height of the boundary walls 26 provided on the cauls passing between the rolls.

These metering rolls are so supported as to accomplish the desired spreading of the mixture over the sheet 15 below the upper sheet 16. The mixer 17 that discharges the mixture of ingredients upon the sheet 15 is so supported, in a well known manner (not shown), as to the travel back and forth transversely across the paper sheet 15 to deposit the mixture thereacross below the sheet 16 and to provide a proper distribution.

Figure 2:
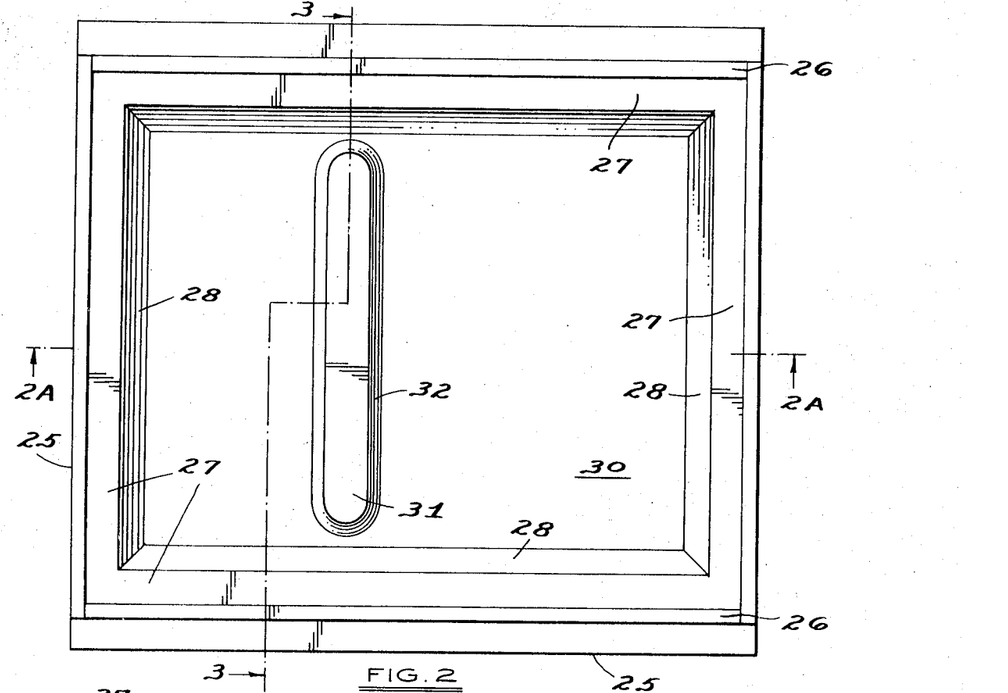
FIG. 2 is a top plan view of a caul structure which constitutes a portion of the apparatus shown in FIG. 1.
Figure 2A:
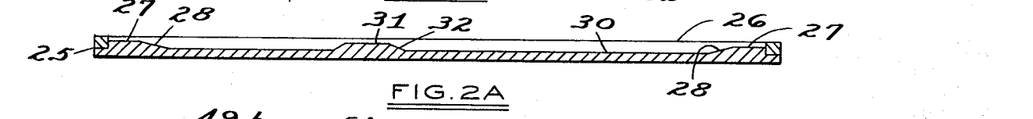
FIG. 2A is a cross-sectional view through the caul of FIG. 2 taken on the line 2A—2A of FIG. 2.
Figure 3:
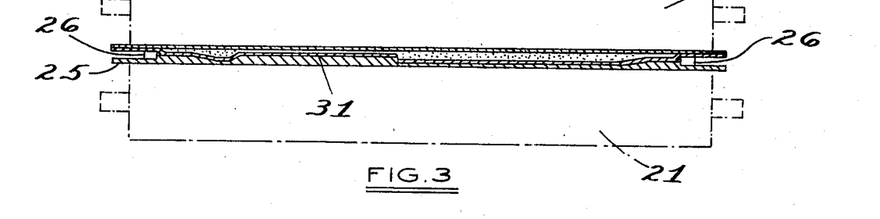
FIG. 3 is a cross-sectional view taken on line 3—3 of FIG. 2, but showing the rigid thermosetting plastic foam layer between its cover sheets as it would be disposed upon its caul and in relation to the metering rolls of FIG. 1.

To provide a foundation sheet or lamination having different determined thicknesses of blown rigid thermosetting plastic foam throughout different determined portions of its area so as to better serve its intended use in the automobile body, as for example a headliner having a reduced thickness and/or tapered margin, and/or to provide for a recessed center or interior area portion to receive a dome light fixture, I provide a caul 25 which is illustrated in plan in FIG. 2. This caul is in the form of a flat plate which may be of metal or plastic and I provide along the longitudinal margins of the caul boundary walls or spacers 26. The upper surface of the caul is contoured to provide inwardly adjacent the longitudinal boundary wall portions 26 and transversely across the ends an elevated plateau portion 27, as shown in FIG. 2. There is then shown an area 28 sloping inwardly from the plateau area 27 toward a central area 30, which central area represents the maximum depth of the contour of the upper face of the caul, and wherein the liquid plastic mixture stands at its maximum thickness upon the paper sheet 15, upon the caul. The sloping area 28 and the plateau area 27 determine the thickness of the thinned out margin of the blown foam plastic sheet.

I have shown in FIG. 2, a somewhat central similarly contoured elevated area upon the upper face of the caul having an upper plateau portion 31 encircled by an outwardly sloping portion 32 leading to the area 30 of maximum contour depth. This provides a recessed portion within the interior of the plastic foam sheet formed to receive a dome light or the like.

These contoured areas varying as to elevation are all provided for the purpose of varying the amount of mixture 12a deposited upon different areas of the cover sheet 15 which directly overlies the caul 25. The plastic mixture 12a that is deposited upon the liner 15, which overlies the caul, varies in thickness upon the caul depending upon whether it is deposited on a depressed area of the caul surface as at 30, or elevated areas as provided by the plateau portions 27 and 31.

These areas of varying elevation of the upper surface of the caul determine the thickness of the viscous liquid mixture deposited upon different areas of the caul. Obviously, the shape and arrangement and elevation of the different areas of the caul depend upon the sheet to be produced and the desired thickness of different areas of said sheet. The contoured areas of different elevation of the caul meter the predetermined amount of resin mixture deposited thereupon as to thickness and consequently predetermine the thickness of the foam sheet produced.

Relationship between contoured surface of caul and space between opposed die faces The particular resin mixture used to provide the rigid foam foundation lamination, generates a gas which expands to create a unicellular foam. This gas must be controlled for it continues to expand until all of the gas-producing ingredients in the resin mix have exhausted their gas producing capacity. If there is more material in one area generating this gas than is required when blown to fill the corresponding area space between the dies, then the gas will seek a place where it can go and expand. When this happens, the travel of the gas through the resin linearly of the plane of the sheet ruptures the cellular structure and causes channels or voids where resin has been displaced and this results in undesirable cavities in the finished product. For this reason, the amount of unblown mixture deposited on each area of the caul must be such that when fully blown, it fills the corresponding space between the opposed faces of the dies and does not exceed the same.

In order to insure that the gas developed in areas of different thicknesses of the layer of liquid plastic formed upon the caul may all be used up in blowing the plastic mass deposited in such areas into the corresponding space areas between the opposed die faces, it is necessary that the various contoured caul area spaces bear a definite determined relationship to the corresponding space areas between the opposed die faces. Different formulations of liquid plastic mixtures blow to different dimensions or rather blow to different times the space occupied by the original mixture as compared with the thermosetting foam formed therefrom. Such increase in space occupied can be determined quite accurately because the proportion of increase is known for different formulations.

It is also necessary that the formed layer of liquid plastic mixture disposed between the cover sheets be properly positioned between the opposed die faces to correspond accurately therewith. For example, if the particular mixture used will blow to twenty-five times its height, it is essential that the space to be filled by the mixture from a determined caul area be twenty-five times the height or depth of said caul area space in order that no gas will be forced to escape into other space areas between the opposed die faces.

Assuming that the liquid plastic mass might have a depth or thickness over area 30 of the caul of 0.012 inch, when blown to twenty-five times such thickness, the blown sponge lamination would have a thickness of 0.300 inch, or approximately $5/_{16}$ inch. From the plateau area 27, the depth of the liquid plastic mass would be more nearly a film and might be 0.004 inch, and when blown to its maximum thickness, it would be 0.100 inch. A determined correspondence must therefore be maintained between the caul depth areas and the corresponding height of the space areas between the opposed die faces.

Continuation of rigid plastic foam lamination and its formation

Figure 4:
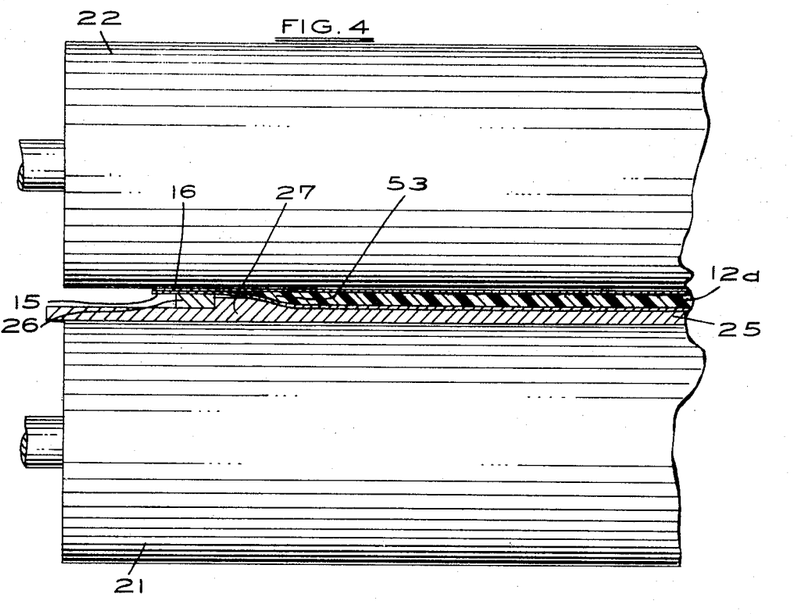
FIG. 4 is a fragmentary cross section taken on the line 4—4 of FIG. 1 showing the metering rolls in elevation and showing the caul with the plastic liquid mixture between the cover sheets thereupon, and showing such caul and cover sheets passing between the metering rolls.

The plastic mixture 12a deposited between the cover sheets 15 and 16 and carried by the caul 25 as it passes between the metering rolls 21 and 22 is leveled off. It is leveled off to a layer of uniform thickness except as determined by the presence of the different contour depths and elevation. FIG. 4 shows a caul 25 carrying the two sheets 15 and 16 with the mixture 12a therebetween passing between the metering rolls 21 and 22. The upper metering roll is riding upon the linear boundary walls 26 which project about the level of the central area 30 of the caul.

To hold the sheets 15 and 16 when cut off with the plastic mixture 12a therebetween down upon the caul, spring clips 35 of metal or the like are provided and gripped over the forward edge of the caul and the forward edges of the cut off sections of sheets 15 and 16. These cilps hold the cover sheets and mixture therebetween upon the caul as the cover sheets and caul are moved along over the table 36, between the rolls. The chips so hold the cover sheets until the rear end of the caul 25 and the cover sheets stretched thereover with the plastic mixture layer therebetween comes underneath a cutoff knife 38 which is closely adjacent to the rolls. At this point, the sheets 15 and 16 are severed by the knife forming one section or one lay-up of the plastic mixture on a caul. The mixture is so deposited upon the cover sheet 15 over the caul face, that the knife 38 passes through the paper sheets 15 and 16 between successive areas of plastic deposit.

After each sheet section has been cut off, it is lifted from its caul and removed to heated die mechanism for further processing as hereinafter described. The caul plate 25 is returned by an operator for reuse and the process is continued. It is, of course, understood that the cauls need not be loose, freely shiftable cauls. Such cauls might be carried by a suitable conveyor belt or the like, being mounted thereupon in spaced succession.

This plastic mixture is provided and deposited between the cover sheets in such an amount that when it has foamed and cured, it forms a rigid foam foundation lamintion of the desired thickness and area to constitute the blown sponge foundation layer of the headliner being fabricated. The liquid plastic mixture which is employed is quite viscous so that the layer between the cover sheets can be handled in the manner described. Each section, when removed from the caul, may be placed upon a carrier plate, not shown, to be carried from the apparatus shown in FIG. 1 to the press. It is understood that the ingredients which are fed through the mixer 17 at one time as a batch are provided in such amounts and proportions as to produce a lamination or sheet of foam of the desired area and density. A suitable mixture is as follows:

Rigid foam headliner layer formulation

"A" Component:  Parts by weight
    Polymethylene polyisocyanate (PAPI) ______ 50.40

"B" Component:
    Polyoxypropylene sorbitol resin, Hydroxyl No. 490 _________________________________ 31.81
    N,N,N'N'-tetrakis (2-hydroxypropyl) diamine catalyst _____________________________ 5.72
    Trichlorofluoromethane blowing agent ______ 10.36
    N,N,N'N'-tetramethyl-1,3 butanediamine (TMBDA) catalyst ____________________ 1.14
    Silicone-Glycol copolymer surfactant DC–201 _ 0.57
                                                  49.60

The above ingredients make up to a mixture of 100 parts by weight and such ingredients may be obtained from the following companies:

PAPI, The Carwin Co., North Haven, Connecticut
Polyoxypropylene Sorbitol, "Niax Hexol LS–490" Union Carbide & Chemical
N,N,N'N' Tetrakis (2-Hydroxypropyl) Diamine, "Quadrol" Wyandotte Chemical
Trichlorofluoromethane, Freon 11–B, DuPont
Silicon, DC–201, Dow-Corning Corporation In the actual use of the ingredients in the mixer, such are not delivered to the mixer individually though they could be, but they are delivered as two separate components hereinabove identified as "A" component and "B" component. The reason for this is that the "A" component and the "B" component are each individually relatively stable and may be maintained in their separate containers to be delivered to the mixer as desired. When they are brought together, however, the reaction starts quickly.

It is necessary that the apparatus be so maintained and so operated that there be no reaction of the ingredients within the mixer or upon the initial deposit of the mixture between the liner sheets or until they have been passed between the metering rolls and the mixture leveled off. It is necessary also that in this intermittent operation, the mixer be entirely exhausted with the passage of each batch of mixture therethrough. Preferably, following each passage of a batch of plastic mixture through the mixer head, the head is flushed with a solvent. This may be done by moving the mixer head over a trough and passing solvent through it. The resin dams 20 should also be cleaned after each batch is discharged and then returned to their holders. The operation is relatively rapid being, with the particular mixture used, in the nature of travel of the sheets 15 and 16 at the rate of ten feet per minute. It is necessary that the operation be carried out rapidly to prevent undesired reaction and foaming.

It is most necessary that foaming due to reaction of the ingredients be prevented in the initial stages before the mixture has passed between the metering rolls because otherwise the metering would be inaccurately carried out. As illustrated, and as is well known, in feeding a liquid mass between metering rolls, it is necessary to maintain a liquid mass head at the nip of the rolls in order that there will always be sufficient of the liquid plastic to fill the space between the rolls. Due to the rapidity with which the mixture of the invention reacts and begins to foam, it is essential, however, that the head does not start foaming. It is also, of course, desirable to carry out the operation rapidly in order to minimize cost.

For the above reason, when each batch is delivered between the paper sheets before they enter the space between the metering rolls, the operation is so carried out that this complete batch mixture will be caused to pass between the rolls before a second batch mixture is delivered to comingle with the head of the previous batch mixture. Otherwise, a head might be built up where end foaming would occur.

The operation might be termed a progressive batch process. The successive batches of mixture each constitute just the exact required quantity to produce the required sheet of sponge layer when the mass is blown. To insure a satisfactory result, all the material delivered to constitute one batch is delivered between the sheets and passes through the metering rolls before a successive batch is delivered to comingle therewith. In this way, there is no build up of a head of mixture at the nip of the metering rolls which would result in foaming at such point.

Figure 5:
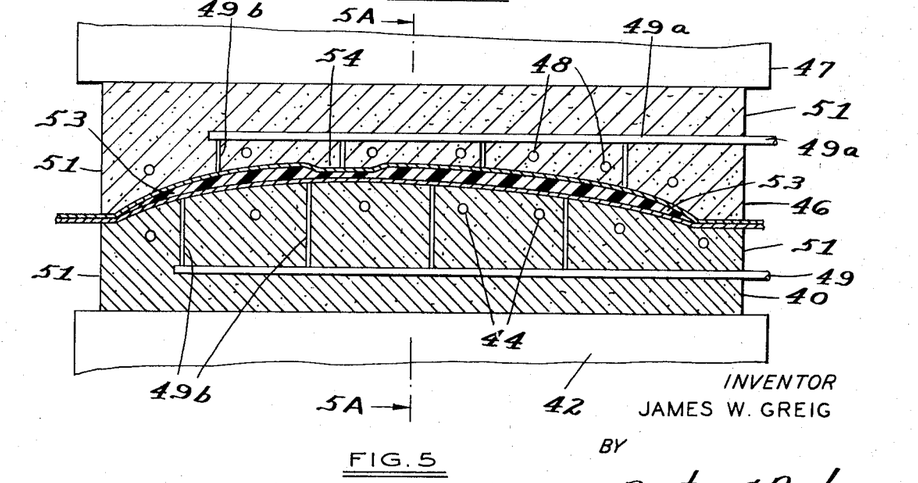
FIG. 5 is a transverse vertical sectional view through a fragment of die mechanism in the form of a press which illustrates the final portion of the process that relates to the completion of the formation of the rigid plastic foam sheet.
Figure 5A:
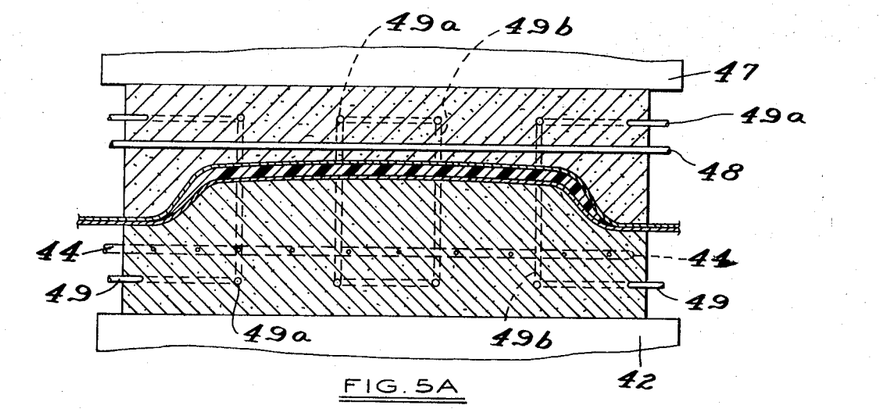
FIG. 5A is a cross-sectional view taken on the line 5A—5A of FIG. 5.

The press shown in FIG. 5 is provided with a lower male die 40 shown in cross section mounted upon a base or platen 42. Such die may be provided with heating means 44 in the form of liquid containing tubes or as desired. There is an upper or female die element 46 carried by a platen 47 supported in conventional manner for relative limited reciprocal movement with respect to the lower die 40. The upper die is provided with heating means 48. The spacing between the two dies throughout different space areas when the dies have been moved toward each other is such as to permit the mixture layer formed on the caul to blow to completion and fill such space areas as heretofore described. The particular mixture of components hereinabove specified will blow to substantially twenty-five times its original thickness as an unblown mixture as hereinabove stated.

The lower die is provided with a vacuum line 49 and short lines 49b lead therefrom to the face of such die to hold the paper liner overlying the plastic thereagainst. The die itself is formed of porous material so that air may be exhausted therethrough from between the face of the lower cover sheet and to draw the cover sheet closely against the face of the die. Both dies are formed of porous material for it is desirable that the upper die be porous so that if desired a similar vacuum may be imposed thereon and vacuum line 49a is shown therein. This vacuum line 49a is also shown with short lines 49b leading to the face of the upper die. The two dies are sealed along all sides as shown by a coat of sealer 51.

The die mechanism of the press is so contoured that the desired general contour shape is given to the plastic foam sheet between the cover sheets within the die, corresponding as to shape and contour with the different thickness areas of the plastic mixture layer. The cover sheets are adhesively secured to the plastic foam sponge during and by its curing and thereafter remain adhered thereto.

It is also contemplated that at the completion of the curing of the sheet in the press, one or both of the cover sheets can be stripped or peeled from the face surfaces of the sheet, if desired, forming a sheet or panel comprised entirely of the cellular foam core and having a surface texture corresponding to that of the cover sheet removed. In such instances where the cover sheet is to be removed, it is usually preferred to employ thin polyethylene or polyvinyl films of relatively low cost which can be discarded at the completion of the press curing operation and which do not become tenaciously bonded to the face surfaces of the foam core.

Figure 9:
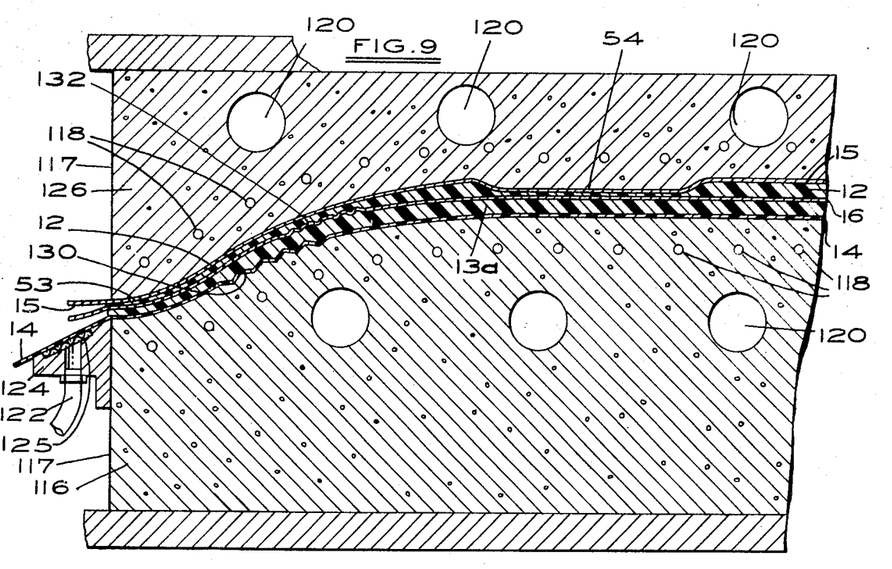
FIG. 9 is a fragmentary transverse sectional view through a portion of the press or die mechanism wherein components formed by the processes illustrated in FIGS. 1–5A and FIGS. 6–8 may be brought together to form a laminated panel having a foundation lamination, a decorative finish lamination and a flexible foam lamination sandwiched and secured therebetween.

At the press following the closure thereof to the desired extent, a vacuum is applied through the lower die as hereinabove described and the plastic layer between the cover sheets is held down against the lower die. If required, the vacuum may be imposed upon the upper die through the line 49a as indicated. In one method of operation found suitable vacuum was applied for a period of five seconds and heat was applied thereafter for a period of one and one-half minutes. Following such treatment, the press was opened and it was found that the sponge mixture had expanded and cured into a rigid foam sheet. The cure is rapid and the expansion is substantial. For the formula hereinabove described, an expansion of approximately twenty-five times the original thickness of the liquid plastic mixture layer resulted. This foamed rigid plastic sponge lamination exhibits the contour shown in the die of FIG. 5. It also exhibits varying thicknesses as defined by the elevated and depressed areas of the contoured caul face, being thinned out adjacent to its margins as shown in FIGS. 5 and 9 at 53, and also thinned out as shown at 54 in FIGS. 5, 9, 10 and 11 to provide a dome light plate recess.

Inasmuch as this rigid foundation plastic foam lamination will constitute the upper lamination of the multiply headliner panel laminate and lie adjacent to the roof of an automobile closed body, one cover sheet thereof and it is here shown as the cover sheet 15, may be an aluminum foil or polyethylene-lined paper sheet, so that its moisture resistant face lies against the roof of the body and prevents transmission of moisture from the roof to a paper sheet that might otherwise pick up moisture and result in undesired expansion.

Flexible plastic foam lamination and its formation

As shown in FIG. 10, there is a flexible urethane sponge lamination 13 which lies adjacent to the rigid sponge lamination 12. It is adhesively secured thereto during the formation and curing thereof in the final press operation, as hereinafter described. This flexible sponge lamination is formed in a manner generally similar to that hereinabove described with respect to the rigid sponge lamination, except as shown in FIG. 6 there is no caul used in its formation and in its stage of formation it is not formed between a pair of dies and in a restricted space area, though, if desired, it could be formed similarly to the formation of the rigid foam sheets as heretofore described.

Figures 6, 8:
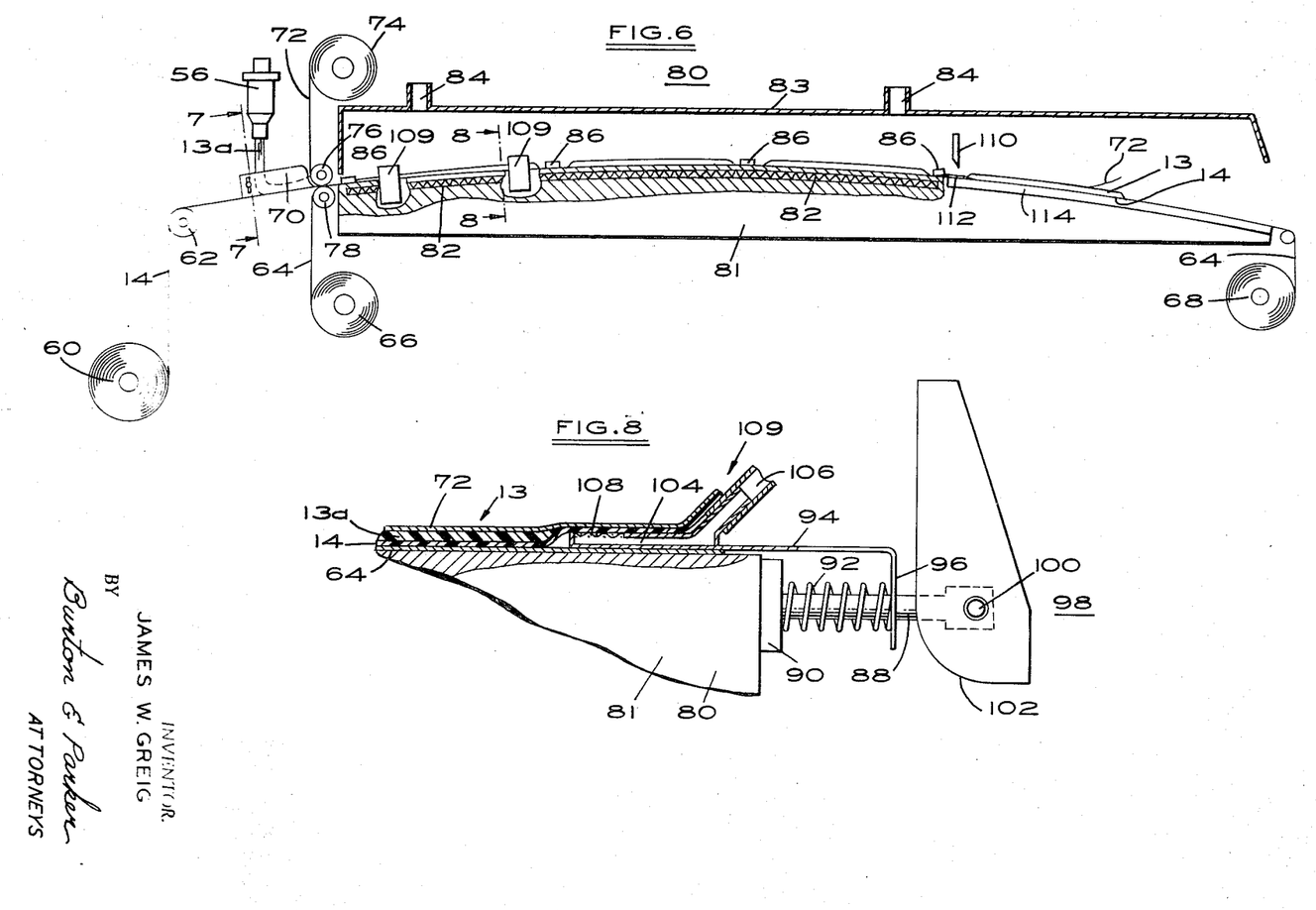
FIG. 6 is a longitudinal sectional, generally diagrammatic view through apparatus designed to carry out the process of forming a mixture layer of ingredients required to form the flexible cushion plastic foam sheet herein described and to accomplish the blowing thereof and the cutting of the same into desired sectional lengths.
FIG. 8 is a transverse cross-sectional view taken on the line 8—8 of FIG. 6 through mechanism provided to grip and tension the outer finish lamination of the multi-ply laminate sheet which includes such outer finish lamination and the flexible resilient overlying sponge lamination secured to the finish lamination.

The apparatus and process involved in forming the flexible thermosetting sponge lamination 13 is schematically shown in FIG. 6. There is a mixer head 56 which is adapted to discharge a suitable mixture of ingredients 13a onto the flexible finish sheet 14, which finish sheet is withdrawn from a roll 60. This flexible finish sheet constitutes the outer surface finish sheet on the underside of the headliner within the car body. It may be a thermoplastic vinyl sheet as heretofore stated and identified as 14. It should be such type of sheet material as to stretch to permit deformation to exhibit a decorative contour design as such is generally desired. To properly support the same, this sheet 14 passes over an idler roll 62 and then is advanced to overlie a belt 64. This belt is a flexible sheet withdrawn from a roll 66. As the belt 64 passes through the machine, it is wound up on a roll 68 at the opposite end of the machine.

The carrier belt 64 and the lower sheet 14, which overlies the same and which carries the mixture that has been deposited thereon, travels underneath dam elements 70 between which dam elements the mixture 13a from the mixing head 56 is delivered. This mixing head 56 is supported as heretofore described in connection with the construction of FIG. 1 so that the head travels back and forth across the flexible sheet 14 between the dams to spread the resin mixture over the sheet 14. This lower sheet 14 may be, and is here shown, as a flexible decorative thermoplastic vinyl finish sheet as heretofore described.

An upper sheet of paper or the like 72 is unwound from a roll 74 and carried down to pass over the upper metering roll 76 and overlie the resin mixture 13a carried on the sheet 14. The lower metering roll is indicated as 78. The two sheets 14 and 72 with the resin mixture 13a therebetween are then advanced between the metering rolls 76 and 78 overlying the carrier belt 64.

As hereinabove described, the mixture of ingredients deposited upon the vinyl sheet 14 is a batch mixture. By that, I mean that a sufficient quantity of desired ingredients from sources not shown are delivered to the mixing head to form the quantity desired batch of the proper ingredients to make up a mixture layer of the desired thickness and area. This process is therefore similar in this respect as the process described in forming the rigid foam layer, and there are spaces between the successive batches of liquid plastic layers. In other words, the ingredients are properly proportioned as to quantity and character. A formula for such which has been found satisfactory is:

FLEXIBLE FOAM HEADLINER LAYER FORMULATION

| | Parts by weight |
|---|---|
| "WA" Component Prepolymer, viscosity approximately 1,000 cp.: | |
| W6 Blend— | |
| Triol Polyether Resin, mol. wt. 3,000, Hydroxyl No. 56, secondary OH groups | 36.0 |
| Ttiol Polyether Resin, mol. wt. 4,500, Hydroxyl No. 37, high in primary OH | 28.0 |
| Diol Polypropylene Glycol Resin, mol. wt. 2,000, OH No. 56 | 16.0 |
| | 80.0 |
| Tolylene Di-Isocyanate (80/20) | 42.0 |
| Silicone—Glycol Co-Polymer Surfactant | 1.5 |
| Stannous Octoate Catalyst | 0.02 |
| | 123.52 |
| "B" Component: | |
| W6 Blend— | |
| Triol Polyether Resin, mol. wt. 3,000, OH No. 56, secondary OH groups | 9.0 |
| Triol Polyether Resin, mol. wt. 4,500, OH No. 37, high in primary OH groups | 7.0 |
| Diol Polypropylene Glycol Resin, mol. wt. 2,000, OH No. 56 | 4.0 |
| | 20 |
| Water | 3.0 |
| Triethylene Diamine Catalyst | 0.15 |
| Dibutyl Tin Dilaurate Catalyst | 0.20 |
| | 23.35 |

Figure 7:
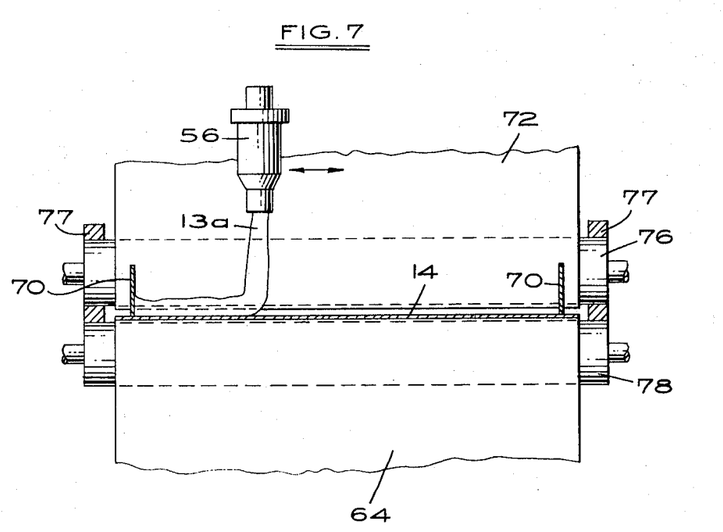
FIG. 7 is a transverse fragmentary cross-sectional view through FIG. 6 on line 7—7 looking toward the mixer and the metering rolls.

The materials listed above do not add up to 100 parts but it is obvious that such could be readily figured in that fashion. Such materials are supplied by the companies listed below, and probably many others:

W-6 Pluracol Blend, Wyandotte Chemical Corporation
Tolylene Di-Isocyanate 80/20, Hylene TM, DuPont
Silicone-Glycol Co-Polymer, DC-201; Dow-Corning Corporation
Stannous Octoate, Nuocure 28, Heyden-Newport Chemical Co.
Triethylene Diamine, Dabco, Houdry Process and Chemical Company
DiButyl Tin Dilaurate, D-22, Union Carbide & Chemical Corporation It would, of course, be possible to deliver these ingredients individually and separately to the mixer head but such would necessitate complicated delivery apparatus and instead of doing that, the two components which make up the sum total of ingredients are individually relatively stable. It is only when they are brought together that reaction commences. For this reason, they are maintained separately and so delivered to the mixer. This is as described in connection with forming the rigid foam. The reaction commences almost immediately but the movement through the mixer is very rapid. Such movement is continuous and the batch of materials which is delivered to the mixer passes continuously therethrough and is mixed during the passing and is discharged upon the sheet 14 and below the sheet 72 and is passed along with the two covering sheets 14 and 72 between the metering rolls 76 and 78 which are so spaced apart as to provide a mixture layer of the desired thickness. The rolls are spaced apart as shown in FIG. 8 by the provision of spacer bands or shims 77 encircling the roll 76 adjacent to its ends, as shown in FIG. 7, to determine the thickness of the layer. As hereinabove specified, in connection with the formation of the rigid foam layer, the mixture layer passes between the metering rolls and is spread out to the desired thickness and then between the two sheets 14 and 72 enters a heated area or oven 80.

The metering roll 76 should be held down with suitable means such as the control mechanism 24 shown in FIG. 1, but not shown in FIG. 6, in order that a predetermined pressure may be brought to bear against the layer mixture between the lower vinyl sheet 14 and the upper paper sheet 72.

Following passing between the metering rolls, this layer of plastic mixture between its two cover sheets enters the heated oven 80 which is here shown as comprising a lower portion 81 and an upper portion 83 which may be heated as through heating means 82 that may be hot water or electricity. The upper portion 83 forms a heating jacket above the lower portion and is provided with air exhaust ducts 84 leading therefrom. The oven may be a multiple stage affair, as for example it may embody three stages. These stages represent merely interruptions in the advance of the belt 64, which belt is halted three times in its movement through the oven as is here shown in a three-stage process. It is apparent that the number of stages, movement of the belt, length thereof, etc., might be varied. It is also apparent that the advance of the belt in successive stages must be coordinated with the feeding of batches thereto. Each interruption represents a stage at which the flexible sponge mixture between the sheets 14 and 72 is halted, heated, blows and advances in its cure. When it has passed through the oven, its expansion is complete but it is not completely cured.

The weighted bars 86 hold the tow sheets 14 and 72 together and down upon the belt 64 so that the two sheets and mixture travel with the belt through the oven. As it appears from FIG. 6, three connected sections or successive batches of plastic mixture are in the oven at one time. The bars are weighted metal bars which are placed at the intervals between successive batches of mixture carried between the sheets 14 and 72. While the construction illustrated shows the three heated stages or halt areas as under the same heat, it is apparent such successive interruption stages might be at varying temperatures.

There are tensioning devices to take up the expansion of the vinyl sheet 14 due to heating. This tensioning device is supported upon the bottom portion 81 of the oven as shown in FIG. 8, which is a view taken on section line 8—8 of FIG. 6. A pin 88 has a base 90 secured to the side wall of the bottom portion 81 of the oven 80. Encircling this pin is an expansion spring 92. An L-shaped bracket 94 has an end portion 96 which slidably encircles the pin 88 and is held outwardly by the spring. The bracket is adapted to be pushed in toward the oven by a lever 98 pivoted at 100 to the pin 88. The lever has a cam end 102 which moves the bracket counter the spring 92 when the lever is actuated so to do. This bracket 94 has a vacuum head portion 104 coupled up with a vacuum line 106. This vacuum head portion 104 has a screened opening 108 which underlies the vinyl cover sheet 14 that carries the plastic mixture. It will be seen that the vacuum head 104 rests freely and slidably upon the belt 64.

When the intermittent movement of the belt comes to a halt at the first stage of the oven, the cam lever 98 is actuated and the vacuum is turned on so as to tension the vinyl sheet 14 to stretch it transversely following heating. In FIG. 6, this tensioning device as a unit is indicated as 109. The tensioning devices are shown only at the first stage or half of the conveyor belt in FIG. 6. It is believed that such will be sufficient but obviously they might be provided at successive stages if found desirable.

As the intermittent movement is resumed so as to bring the plastic layer 13a between the two cover sheets 14 and 72 to the second stage, the tensioning devices on the vacuum head are released. This control of tensioning means and vacuum may be manual as here shown or it might be automatically carried out. The weighted bars 86 move along with the flexible foam sandwich between cover sheets 14 and 72. The movement is thus continued until the flexible foam sandwich has entered the tail end of the oven.

At this point, its blowing or expansion has been completed but it is not completely cured. A knife 110 is provided which knife may be normally or automatically operated. It is used to cut through this sandwich lamination of the upper paper layer 72 and the vinyl sheet 14. This knife is operated to cut through the paper intervals between the plastic layers. A cutting plate 112 overlies the table 114 above the belt 64 and against which the two cover sheets may be cut into sections of the desired length with the knife 110. It is understood that the weighted bars 86 which are free are removed and used over again.

Following the passing of the flexible foam layer through the oven between its cover sheets 14 and 72 and the cutting of the same into sections or lengths with the knife 110 as hereinabove described, the upper cover sheet 72 is stripped from the plastic foam. The foam has expanded to its maximum extent, which, as hereinabove stated, is approximately twenty-five times its normal unexpanded thickness. This foam has not completely cured, however, and the stripping of the upper cover sheet 72 therefrom is readily accomplished. This cover sheet is of paper which is somewhat porous, as for example, kraft paper. The stripping of such cover sheet from the flexible blown plastic foam lamination 13 fractures the surface air cells of the expanded plastic sheet and exposes a surface which is tacky. It is sufficiently tacky so that when it is superposed upon the rigid contoured plastic foam lamination 12 heretofore described as resulting from the process illustrated in FIGS. 1 through 5, it adheres thereto.

FIG. 9 illustrates the juxtaposition of the rigid foam laminate 12 as carried between its two cover sheets 15 and 16, which was formed in the press as shown in FIG. 5, and the flexible foam laminate which was expanded in the oven but has not been shaped or completely cured and which now embodies, after the stripping of the cover sheet 72 therefrom, merely the lower cover sheet 14 of thermoplastic vinyl and the flexible urethane sponge which is blown and is indicated as an uncured plastic blown layer 13a and is indicated in FIGS. 10 and 11 as a blown and cured lamination 13, and in FIG. 9 as a blown but incompletely cured layer 13a.

FIG. 9 shows die mechanism or press apparatus in which the dies are contoured to the same shape as that of FIG. 5 because it is adapted to receive the rigid foam laminate that is formed in FIG. 5 plus the flexible foam layer underlying the rigid foam lamination and formed as a result of the operation hereinabove described as resulting from the process of FIG. 6. The lower male portion of the die mechanism of FIG. 9 is indicated as 116. It may be a porous mold as shown. In may be heated in any suitable manner as by heating tubes 118, as described in connection with the description of FIG. 5. There are vacuum manifold lines 120, extending therethrough, which may be provided in the upper die also. It is obvious that if desired vacuum lines having connections with the face of the die, as shown in FIG. 5, could be provided. FIG. 9 shows only a fragment of the die mechanism. The mold is porous so that suction is brought to bear therethrough upon its working face and the air is exhausted therefrom and also the vinyl sheet 14 is held downwardly thereagainst. The die would be mounted on a suitable platen, not shown, and the outer sides of the die would be sealed as at 117, all as described in connection with the description of FIG. 5.

As hereabove stated, upon the removal of the upper cover sheet 72, the exposed surface of the flexible plastic blown mixture lamination 13a is in a tacky state and when it is placed against the cover sheet 16 of the rigid plastic layer, it adheres thereto. When the rigid plastic layer with its two cover sheets 15 and 16 has the plastic flexible layer 13a with its covering sheet of vinyl 14 assembled therewith, the flexible plastic layer 13a adheres to the rigid plastic layer, or rather to its cover sheet 16, and in the press shown in FIG. 9 it is cured thereagainst. Being cured thereagainst it adheres securely permanently thereto.

In addition to the vacuum which is brought to bear by the suction established within the porous mold 116 holding the vinyl thereagainst, there is a vacuum line 122 which may be controlled manually or automatically as desired. Such vacuum line communicates with a trough 124 that extends along each linear edge of the mold 116 and this trough carries porous material 125. The vacuum exerts a tension upon the vinyl sheet 14 extending over the porous material 125 to hold the same taut across the die during the operation of the die mechanism. This device operates as a tension holddown. It may be noted that only the vinyl sheet 14 extends across the tension holddown.

The upper or female portion of the die is indicated as 126. It is carried by a platen, not shown, as set forth in the description of FIG. 5. This die also has its sides airsealed as at 117. It also is provided with heating means 118 as illustrated and hereinabove described. Any suitable heating mechanism may be used. The face of the die 116 in addition to being contoured to fit the upper female die, is also preferably decoratively designed as shown at 130 to provide upon the thermoplastic vinyl sheet a decorative pattern or design suitable for a finish sheet within an automobile body.

Due to the vinyl being a thermoplastic sheet, it would not normally retain permanently, under varying conditions of temperature, a decorative design thus imposed. Here, however, this decorative design is also imparted to the flexible foam layer 13 which is a thermosetting layer and, therefore, permanently retains the design and holds the vinyl to such design.

Th rigid plastic foam layer 12 is shown in FIG. 9 as having a paper cover sheet 16 which may well be wrinkled as shown at 132, FIGS. 9, 10 and 11. Such wrinkling frequently occurs in the paper cover sheet in the formation of this rigid plastic foam. Due to the presence of the flexible foam layer such wrinkling does not show through on the surface of the finish vinyl sheet 14. Any wrinkling or protrusions are absorbed within the thickness of the flexible foam lamination 13.

Due to completing the cure of the flexible foam within the press, as shown in FIG. 9, with its exposed uncured plastic face against the face of the rigid foam layer cover sheet 16, the rigid foam foundation lamination 12 and the flexible urethane foam lamination 13 are securely bonded together. The rigid lamination forms the foundation lamination for the three-ply headliner in the three-ply construction. The finish lamination 14, which has been decoratively embossed as at 130, is permanently held to such embossed dtsign by having the same imparted into the thermosetting flexible urethane foam lamination 13 when its cure is completed in the press shown in FIG. 9. The headliner when removed from the press is trimmed as desired and is then ready for use. The rigid foam foundation lamination 12 and the flexible cushion foam lamination 13 are both thermosetting laminations and permanently retain their shape and contour and hold the thermoplastic lamination to such shape and the decorative design which has been imparted thereto.

Due to the fact that the flexible foam lamination is fully blown in the oven, as shown in FIG. 6, but is not completely cured when removed therefrom, such flexible foam lamination 13 will be densified through certain areas and certain thickness in the press FIG. 9. It will be cured at this densified thickness so that it will retain the same because it is to be remembered that this layer 13 is also a thermosetting sponge layer and that the press operation wherein its cure is completed and it is secured to the rigid sponge layer takes place at the time layer 13 is in the incompletely cured state.

It should be stated, however, that if it were desired the flexible sponge layer might be formed on a caul as shown in connection with the formation of the rigid sponge layer and generally according to such process. Such preformed flexible sponge layer would have its one cover sheet stripped therefrom before the cure was completed and would be juxtaposed against the formed rigid sponge layer and would have its cure completed thereagainst in the press as in FIG. 9, except that instead of being densified in the press to a reduced thickness throughout certain areas, it would have been formed originally at the desired thicknesses and its cure would have been advanced sufficiently so that it would retain such shaped contour.

While it will be apparent that the invention herein disclosed is well calculated to fulfill the objects above stated, it will be appreciated that the invention is susceptible to modification, variation and change without departing from the subjoined claims.

What is claimed is:

1. A process of forming a plastic foam sheet exhibiting areas of different thicknesses comprising, in combination, providing two impervious cover sheets, at least one of said cover sheets being flexible, depositing a plastic foam forming mixture in the liquid uncured state between said cover sheets, arranging said mixture in a layer having areas of different determined thicknesses, confining said sheets and mixture against a contoured die surface providing a molding space of varying thickness, the thicker areas of said mixture corresponding to the thicker areas of said molding space, and curing and foaming said mixture against said die surface.

2. The process of forming a plastic foam sheet exhibiting local areas of different thicknesses as defined in claim 1, characterized in providing a caul having a working face one area of which is elevated above an adjacent area disposed underneath the lower cover sheet with the working face of the caul against the sheet and further characterized in depositing a determined quantity of plastic foam forming ingredients in the uncured state upon that portion of the lower cover sheet overlying the caul, and exerting pressure upon the upper cover sheet smoothing out the plastic mixture between the cover sheets and forcing the lower cover sheet into close contact with the different elevated areas of the working face of the caul thereunderneath thereby producing a mixture layer between the cover sheets upon the caul which mixture layer exhibits areas of different thicknesses, and causing said plastic mixture layer to blow into a foamed plastic sheet exhibiting areas of different thicknesses corresponding to the areas of different thicknesses of the layer between the cover sheets.

3. The process of forming a plastic foam sheet exhibiting local areas of different thicknesses as defined in claim 1, characterized in providing a caul having a working face one area of which is elevated above an adjacent area thereof, disposing said caul underneath the lower cover sheet with the working face of the caul against the sheet, and further characterized in depositing a determined quantity of plastic foam forming ingredients in the uncured state upon that portion of the lower cover sheet overlying the caul, passing the caul with the two cover sheets thereover and with the plastic foam mixture therebetween and while it is in the liquid state between a pair of metering rolls smoothing out the mixture and forcing the lower cover sheet into close juxtaposition with the low and high areas of the working face of the caul producing a mixture layer of varying thicknesses between the cover sheets and thereafter subjecting the liquid foam mixture between the cover sheets to heat producing a blowing of the same between the cover sheets into areas of varying thicknesses corresponding to the areas of different thicknesses of the layer upon the caul.

4. The method of forming a plastic foam sheet exhibiting areas of different thicknesses as defined in claim 1, characterized by placing those portions of the cover sheets between which the plastic layer is deposited between a pair of dies the opposed faces of which define a space therebetween which space exhibits areas corresponding to the different thickness areas of the plastic layer between the cover sheets and which areas are so dimensioned between the opposed die faces as to permit the different thickness areas of the plastic layer to blow substantially to their maximum thickness between the opposed faces of the dies without causing the gas producing the blowing to form blow channels through the foam sheet being formed while restricting the thickness of the different blown areas of the foam sheet to the space defined by the opposed faces of the dies whereby such faces determine the contour of the opposed faces of the foam sheet.

5. The process of forming a foam plastic sheet as defined in claim 1, characterized in that the layer of uncured plastic mixture is formed upon a flexible cover sheet overlying the working face of a caul, which working face is contoured to exhibit areas of different elevation whereby the mixture layer is formed upon the cover sheet in areas of different thicknesses corresponding to the areas of different elevation of the working face of the caul, and the layer of uncured mixture having areas of different thicknesses is blown within a heating chamber having area portions which correspond in area with the areas of different elevation of the caul and correspond in height with the areas of different thicknesses of the mixture layer multiplied by the number representing the amount of blow such thickness will attain under maximum conditions but without restricting the same sufficiently to produce gas blow channels therethrough, while restricting the same sufficiently to determine the facial configuration of the blown sheet.

6. The process as defined in claim 1, including the further step of stripping at least one of said cover sheets from the face of the layer after foaming and curing thereof.

7. The process as defined in claim 1, wherein said cover sheets are thin plastic films which are removed from the faces of the foam layer after completion of the foaming and curing thereof.

8. The process as defined in claim 1, wherein said plastic foam forming mixture comprises a liquid reaction mixture for forming a polyurethane foam.

References Cited
UNITED STATES PATENTS

| | | | |
|---|---|---|---|
| 2,271,058 | 1/1942 | Binns | 264—47 X |
| 2,723,936 | 11/1955 | Ryan | 156—209 |
| 2,950,221 | 8/1960 | Bauer et al. | 156—78 X |
| 2,956,310 | 10/1960 | Roop et al. | 156—79 X |
| 2,977,639 | 4/1961 | Barkhuff Jr., et al. | 156—79 X |
| 3,193,406 | 7/1965 | Mittelman | 156—79 X |
| 3,305,381 | 2/1967 | Van Wagenen | 156—79 X |

BENJAMIN A. BORCHELT, Primary Examiner

G. E. MONTONE, Assistant Examiner

U.S. Cl. X.R.

264—47